May 13, 1952      O. J. POUPITCH      2,596,596
FASTENING DEVICE
Original Filed Sept. 1, 1948
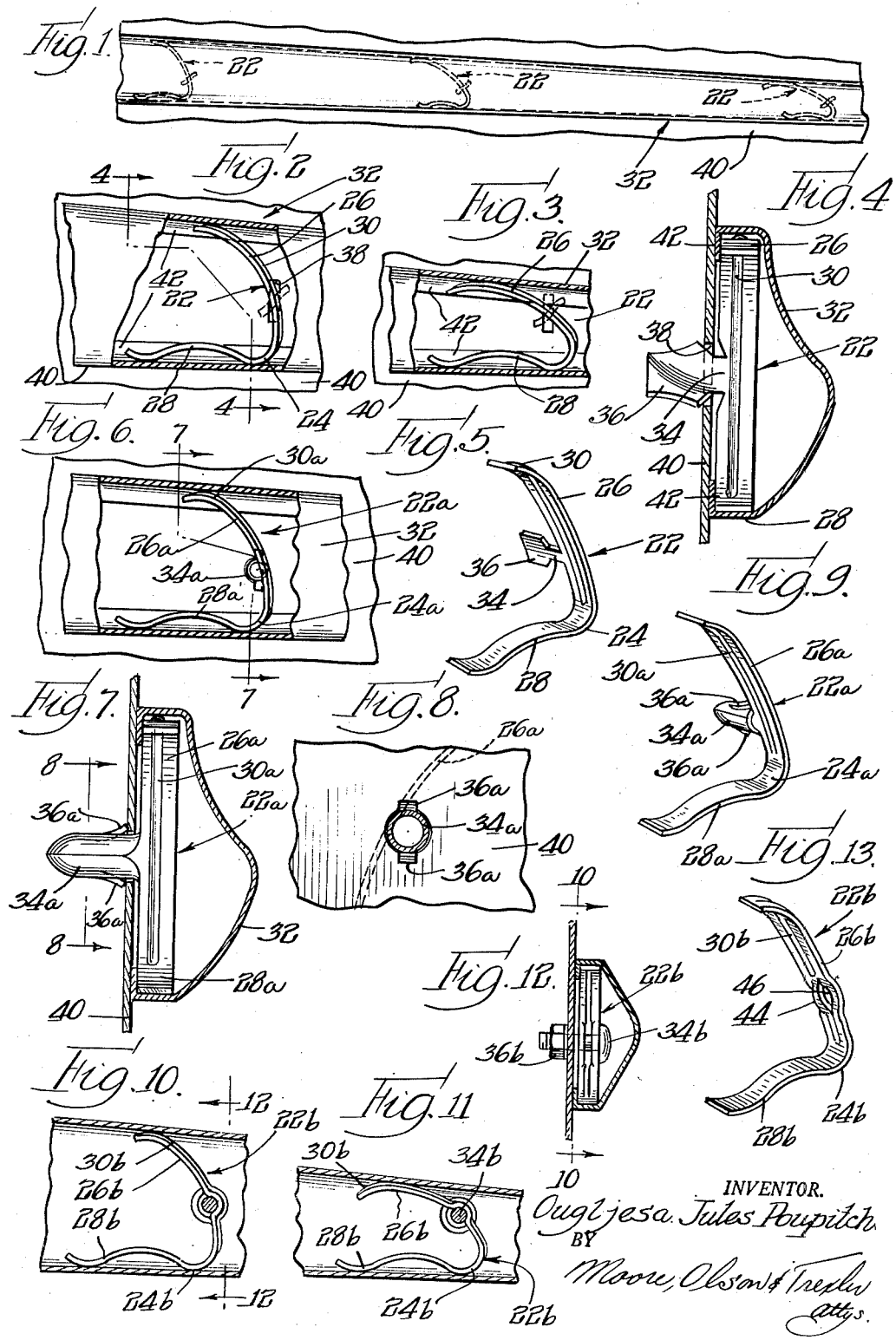
INVENTOR.
Ougljesa Jules Poupitch
BY Moore, Olson & Trexler
attys.

Patented May 13, 1952

2,596,596

UNITED STATES PATENT OFFICE 2,596,596

FASTENING DEVICE

Ougljesa Jules Poupitch, Chicago, Ill., assignor to Illinois Tool Works, Chicago, Ill., a corporation of Illinois Original application September 1, 1948, Serial No. 47,245, now Patent No. 2,515,895, dated July 18, 1950. Divided and this application June 24, 1950, Serial No. 170,144

6 Claims. (Cl. 24—73)

This invention relates generally to fastening devices capable of being used to secure molding strips and the like in place, and more particularly to fastening devices of that type comprising a strip of sheet metal stock capable of traversing the open side of a channeled work piece such as a molding strip.

This is a division of my copending application, Serial No. 47,245, filed September 1, 1948 now Patent No. 2,515,895, granted July 18, 1950. As pointed out in said copending application, clips of various types have heretofore been employed to secure molding strips in place, and many of such fasteners are designed to accommodate a given width of molding strip and are adapted for use only with a strip of given width. It is therefore an important object of the present invention to provide an improved fastener or clip of extremely simple and inexpensive construction, namely, from spring strip stock, which is self-adjustable to accommodate molding strips of various widths.

More specifically, the invention contemplates improved fasteners of the type referred to above wherein a strip of spring stock is so formed that the flat side of the strip at one extremity is adapted to engage one wall of a molding strip, and the opposite extremity is adapted to engage the opposite molding wall, at least a portion of said strip being yieldable so as to accommodate itself to moldings of various widths.

It is a further object of the present invention to provide fasteners or clips of the type just referred to in which a fastener element or means is associated therewith so as to render the sheet metal strip capable of supporting or being supported by a work piece, as for example a sheet panel upon which a molding strip is to be mounted.

The foregoing and other objects and advantages will be more apparent from the following detailed description, when considered in connection with the accompanying drawing, wherein Fig. 1 is an elevational view of a tapered molding strip showing the application thereto of the fasteners contemplated by the present invention;

Figs. 2 and 3, respectively, are enlarged elevational views of two of the molding clips of Fig. 1 illustrating the manner in which a fastener of a given size may be employed in operative association with molding strips of different widths;

Fig. 4 is an enlarged transverse sectional view taken substantially along the line 4—4 of Fig. 2;

Fig. 5 is a perspective view of the sheet metal clip of Figs. 1 to 4 inclusive, detached from the molding strip;

Fig. 6 is a view similar to Fig. 2 illustrating a molding clip of modified form equipped with an integral shank adapted to be snapped into the aperture of a supporting structure;

Fig. 7 is an enlarged transverse sectional view taken substantially along the line 7—7 of Fig. 6;

Fig. 8 is a fragmentary sectional view taken along the line 8—8 of Fig. 7;

Fig. 9 is a perspective view of the clip of Figs. 7 and 8 detached from the molding strip;

Fig. 10 is an elevational view of a modified clip operatively associated with a molding clip which is shown in longitudinal section, said clip being formed to accommodate a stud;

Fig. 11 is a view similar to Fig. 10 illustrating the use of the same molding clip for a molding strip of less width;

Fig. 12 is a transverse sectional view taken substantially along the line 12—12 of Fig. 10; and Fig. 13 is a perspective view of the sheet metal portion of the molding clips illustrated in Figs. 10 to 12 inclusive.

Referring now to the drawing more in detail, wherein like numerals have been employed to designate similar parts throughout the various figures, Figs. 1 to 5 inclusive illustrate one embodiment of the fastener or clip of the present invention, said clip being designated generally by the numeral 22. This clip 22 is formed from a single sheet of elongated strip stock which is folded or bent flatwise at the connecting or fulcrum portion 24 to provide a pair of arms 26 and 28. The arm 26 is relatively rigid due to the provision of a longitudinal rib 30 extending over substantially the entire length of the arm. The arm 28 is preferably resilient so as to constantly urge the surface of limited area presented by the curved free extremity of the arm 26 into engagement with one wall of a channeled work piece or molding clip designated generally by the numeral 32. It will be noted that the resilient arm 28 is bowed so as to present an area of limited contact with the opposite wall of the molding strip 32.

Extending from and formed integral with an intermediate portion of the relatively rigid arm 26 is a neck portion 34 supporting a shank 36. This shank 36 is adapted to be accommodated by a complementary slot 38 in a work piece or panel 40.

In initially applying the arms 26—28 and their connecting fulucrum portion 24 to the open side of the molding strip 32, said arms are compressed toward each other sufficiently to permit clearance of the opposite extremities thereof through the longitudinal opening of the molding strip positioned between the inturned molding flanges 42. After such insertion the relative yieldability of the arms 26—28 will cause the extremity of the relatively rigid arm 26 to bear against one wall of the molding strip and the free extremity of the other arm 28 to bear against the opposite wall. After these clips have been distributed along the molding strip as for example the tapered strip shown in Fig. 1, the fastener shanks 36 may be inserted within their complementary slots 38. It will be necessary, after insertion of the shank 36, to rotate said shank so as to traverse the slot and at the same time cause the cam surface at the free extremity of the arm 26 tightly to be forced into engagement with one wall of the molding strip. Thus the rotation of the shank 36 causes the clip arms to be tightened against the molding flanges 42, and said arms will exert strong camming action against the opposed walls of the strip.

It will be apparent from the foregoing description that the arms 26—28 may be made from a strip of sheet metal spring stock by practicing conventional forming and stamping methods. It will also be understood that the engagement of the free extremity of the arm 28 with one wall of the molding strip tends rotatably to urge the work engaging extremity of the arm 26 into firm impingement with the opposite wall of the strip. Also any rotation of the shank 36 in the same direction will tend to increase the aforesaid impingement.

Figs. 6 to 9 inclusive disclose a modified form of molding clip which is designated generally by the numeral 22a. This clip 22a is similar in every respect with the previously described clip 22 except that in place of the neck 34 and shank 36 a tubular stud or shank 34a and resilient locking fingers 36a are provided. The other elements of the fastener 22a are designated by numerals corresponding with similar structures of the fastener 22 except that these numerals are used in association with a suffix "a". The clip 22a is insertable between opposed walls of the strip 40 in a manner previously described in connection with the clip 22. The fastener portion extending axially of the arms 26a—28a is in the form of a snap fastener, adapted to be inserted within a cylindrical work aperture. Upon complete insertion of the shank portion within the cylindrical work aperture the fingers 36a spring outwardly so as to engage the adjacent side of the work piece or panel 40 as clearly shown in Figs. 7 and 8.

In Figs. 10 to 13 inclusive a still further modification of the fastener member or clip is disclosed, said clip being designated generally by the numeral 22b. The clip 22b is similar in all respects to the previously described clips 22 and 22a except that the intermediate portion of the arm 26b is provided with a struck-out portion 44 so as to provide a screw or stud accommodating aperture 46. In Figs. 10 to 12 inclusive the screw member or stud 34b and complementary nut 36b is disclosed and this stud performs the same function as the snap-in type fastener 34a—36a of the clip 22a and the fastener 34—36 of the clip 22. Numerals bearing the suffix "b" have been applied to the disclosures of the clip 22b to identify structures corresponding with similar structures of the clips 22—22a.

From the foregoing it will be apparent that the invention contemplates the production of a fastener or clip for channeled members such as molding strips which may be made from a single strip of metallic spring stock. All of the above described fasteners present cooperating arms formed by bending a strip intermediate the ends thereof to provide opposed surfaces for engaging opposite walls of the channeled work piece. Also all of the disclosed embodiments include, in addition to the aforesaid strip, means in association with one of the arms thereof for fastening the clip to a supporting work structure. The clips contemplated by the present invention are adapted to be used with channeled work pieces of varying sizes, tapered, et cetera. In other words, a clip of a given size may be applied to channeled work pieces such as molding clips of varied widths.

It will be apparent from the foregoing disclosure that the invention is not limited to the specific structural details described herein, but is capable of other modifications and changes without departing from the spirit and scope of the appended claims.

The invention is hereby claimed as follows:

1. A spring clip for use with channel-shaped members including a head for traversing the space between opposed walls of a channelled work piece, said head comprising a strip of sheet metal bent transversely intermediate its ends into generally V-shape and presenting a pair of arms diverging from and relatively shiftable about the axis of a yieldable connecting hinge section, one of said arms constituting a strut member which is relatively rigid as compared with the other arm, said hinge section having a bearing surface for engaging one of the opposed walls of said channelled work piece, said relatively rigid strut member having a bearing surface in the vicinity of its free extremity for engaging the opposite wall of the aforesaid channelled work piece and adapted to traverse the space between opposed wall surfaces, the other of said arms having a free work-engaging extremity movable in a plane substantially normal to the axis of said hinge for urging said rigid arm into strutting relation with respect to the opposed walls of said channelled work piece, and a shank positioned intermediate the extremities of and extending from one of said arms in substantial parallelism to the hinge axis for accommodating an apertured work piece.

2. A spring clip for use with channel-shaped members as set forth in claim 1, wherein the shank comprises an integral intermediate extension from the margin of one of the arms.

3. A spring clip for use with channel-shaped members as set forth in claim 1, wherein the shank comprises a tubular snap fastener structure.

4. A spring clip for use with channel-shaped members as set forth in claim 1, wherein the shank comprises a screw member supported by one of the arms.

5. A spring clip for use with channel-shaped members as set forth in claim 4, wherein one of the arms is provided with a struck-out portion to provide an aperture for accommodating the screw member.

6. A spring clip for use with channel-shaped members as set forth in claim 1, wherein the less rigid arm is arched intermediate its extremities so as to present a bearing surface of limited area in the vicinity of the free extremity of said arm.

OUGLJESA JULES POUPITCH.

REFERENCES CITED

The following references are of record in the file of this patent:

UNITED STATES PATENTS

| Number | Name | Date |
|---|---|---|
| 2,192,344 | Fernberg | Mar. 5, 1940 |
| 2,214,150 | Van Uum | Sept. 10, 1940 |
| 2,450,306 | Sickles | Sept. 28, 1948 |
| 2,531,352 | Churchill | Nov. 21, 1950 |